United States Patent Office 3,842,105
Patented Oct. 15, 1974

3,842,105
PROCESS FOR THE PREPARATION OF
16,17-UNSATURATED STEROIDS
Helmut Hofmeister, Henry Laurent, Klaus Prezewowsky, and Rudolf Wiechert, Berlin, Germany, assignors to Schering Aktiengesellschaft, Berlin and Bergkamen, Germany
No Drawing. Filed Feb. 9, 1973, Ser. No. 331,060
Claims priority, application Germany, Feb. 11, 1972, P 22 07 420.0
Int. Cl. C07c 169/20, 169/32
U.S. Cl. 260—397.45                 7 Claims

ABSTRACT OF THE DISCLOSURE

Heating a $\Delta^{17(20)}$-20-acyloxy-21-aldehydic steroid of the formula

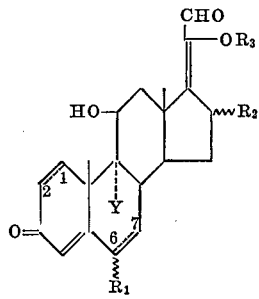

wherein $$C_1\text{====}C_2 \text{ and } C_6\text{====}C_7$$

are saturated or unsaturated carbon-to-carbon bonds; $R_1$ is hydrogen or methyl in the $\alpha$- or $\beta$-position when $$C_6\text{====}C_7$$

is a saturated bond, and fluorine, chlorine, bromine or methyl when $$C_6\text{====}C_7$$

is an unsaturated bond; $R_2$ is hydrogen or lower alkyl in the $\alpha$- or $\beta$-position; $R_3$ is lower alkanoyl of 1–5 carbon atoms; and Y is hydrogen or fluorine; in a polar organic solvent and in the presence of an alkali or alkaline earth salt of a lower alkanoic acid of 1–5 carbon atoms, of carbonic acid, or of an aromatic acid, produces the corresponding $\Delta^{16}$-20-keto-21-acyloxy steroid.

BACKGROUND OF THE INVENTION

This invention relates to a process for the production of $\Delta^{16}$-20-keto-21-acyloxy steroids.

A process is already known for the production of 11$\beta$-hydroxy-16-pregnene-3,20-diones. See Salce et al., J. Org. Chem. 35 (1970) 1681. In this procedure, according to Gardi et al., J. Org. Chem 27 (1962) 668, a 17$\alpha$,21-ortho ester is produced from 11$\beta$,17,21-trihydroxy-3,20-diketo-4-pregnene, which ortho ester must be split at an exactly adjusted pH to the 17$\alpha$-acyloxy-11$\beta$,21-dihydroxy compound, in order to prevent the migration of the 17-acyloxy group into the 21-position. After esterification of the 21-hydroxy group, the 17$\alpha$-acyloxy group is split off with the $\Delta$16-double bond. The process is executed via four stages, the second stage of which (formation of the ortho ester) results in unsatisfactory yields, since acyloxy compounds of a low carbon atom number also esterify the 11$\beta$-hydroxy group to form 11$\beta$-acyloxy compounds.

The process of this invention has the advantage that, with the use of the same starting compounds, i.e., non-esterified 11$\beta$,17,21-trihydroxy-20-keto pregnanes, as in the conventional process, one reaction stage is eliminated, on the one hand, and higher yields are obtained, on the other hand.

The course of the process of this invention is surprising because one could not forsee the isomerization of the 17, 20-double bond to the 16-position. Rather, it would be expected that, under the alkaline conditions employed, a side chain degradation to the 17-carboxylic acid (J. Chem. Soc. 1964, 586) would occur.

SUMMARY OF THE INVENTION

According to the process of this invention, $\Delta^{4,16}$-11$\beta$-hydroxy-3,20-diketo - 21 - acyloxy steroids of the general Formula I

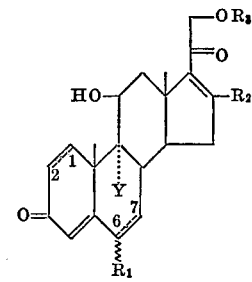

wherein $$C_1\text{====}C_2 \text{ and } C_6\text{====}C_7$$

are saturated or unsaturated carbon-to-carbon bonds; $R_1$ is hydrogen or methyl in the $\alpha$- or $\beta$- position when $$C_6\text{====}C_7$$

is a saturated bond, and flourine, chlorine, bromine or methyl when $$C_6\text{====}C_7$$

is an unsaturated bond; $R_2$ is hydrogen or lower alkyl; $R_3$ is lower alkanoyl of 1–5 carbon atoms; and Y is hydrogen or fluorine; are produced by heating a compound of the general Formula II

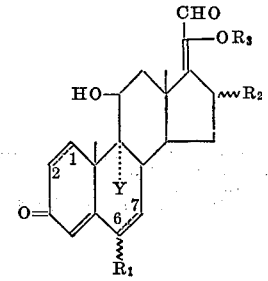

wherein $$C_1\text{------}C_2, C_6\text{------}C_7$$

$R_1$, $R_3$ and Y have the values given above and $R_2$ is hydrogen or lower alkyl in the $\alpha$- and $\beta$-position, in a polar organic solvent and in the presence of an alkali or alkaline earth salt of a lower alkanoic acid or 1–5 carbon atoms, of carbonic acid, or of an aromatic acid.

DETAILED DISCUSSION

In the above formula, $R_2$ is preferably methyl. Examples of lower alkanoyl are acetyl, propionyl, n-butyryl, iso-butyryl and valeryl, preferably acetyl.

The starting compounds of general Formula II are produced from the corresponding 11$\beta$-hydroxy steroids having a dihydroxyacetone side chain by a Mattox rearrangement [J. Am. Chem. Soc. 74 (1951) 4340] with the formation of an enol aldehyde, i.e., a 20-hydroxy-17(20)- pregnen-21-al, which latter compound is subsequently esterified in a conventional manner, for example, with a reactive acid derivative.

In order to conduct the process of this invention, the starting $\Delta^{17(20)}$-20-acyloxy-21-al steroid is heated in an organic polar solvent in the presence of an alkali and alkaline earth salt of a lower alkanoic acid of 1–5 carbon atoms, such as, for example, calcium or potassium acetate, of carbonic acid, e.g., lithium carbonate, and of an aromatic acid, e.g., the sodium or potassium salt of p-toluic acid or benzoic acid. The term alkali and alkaline earth salts as used herein is intended to include salts of the metals of Groups IA, preferably Na, K or Li; IIA, preferably Mg, Ca or Ba, e.g. barium acetate.

The alkali or alkaline earth salt of any aromatic acid can be employed, so long as the aromatic moiety, except for the carboxylic acid salt group, is essentially inert under the reaction conditions, including mono and dicyclic carbocyclic acid containing from 6 to 12 ring carbon atoms, which can contain one or more inert ring substituents, e.g., nitro, lower-alkoxy, e.g., methoxy, lower-alkyl, e.g., methyl, halo, e.g., chloro, amido, carbamide, lower-alkanoyloxy, etc. Preferred salts of aromatic acids are the salts of carboxylic acids.

The amount of the salt employed is not critical. Although a molar excess can be employed, it is not required because it is not consumed in the reaction.

The process of this invention is advantageously conducted under an atmosphere of a protective gas, in order to avoid side-reactions produced by the presence of atmospheric oxygen. The process is also preferably conducted under as anhydrous conditions as can be conveniently achieved to avoid hydrolytic side-reactions.

The reaction is preferably conducted at a temperature from about 80° C. to the boiling point of the solvent employed, At temperatures of 100–130° C., the reaction usually is completed in from about one hour to several hours.

The solvents employed in the process of this invention are polar solvents. Examples, are pyridine, glacial acetic acid, dimethyl, sulfoxide, dimethylformamide, dimethylacetamide, acetonitrile and similar solvents. Preferred are acid amides of lower alkanoyl acids.

The amount of solvent employed is not critical, so long as at least some and preferably all of the starting steroid is dissolved therein.

The compounds which can be produced in accordance with the present invention are either themselves pharmacologically effective compounds and/or can be employed as intermediates for the preparation of such compounds according to conventional synthetic schemes. Thus, for example, the conventional effective agent fluprednylidene is obtained, for example, from 9-fluoro-11β-hydroxy-21-acetoxy-16-methyl - 1,4,16 - pregnatriene-3,20-dione by epoxidation, epoxide splitting and subsequent hydrolysis of the 21-acetoxy group.

Without further eleboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

40 g. of 11β-hydroxy - 20 - acetoxy-3-oxo-1,4,17(20)-pregnatrien-21-al (produced, for example, according to U.S. Pat. 3,255,218) is agitated under a nitrogen atmosphere with 20 g. of anhydrous potassium acetate in 800 ml. of dimethylformamide for 1 hour at 120° C. The reaction mixture is vacuum-filtered, taken up in methylene chloride, and dried over sodium sulfate. After chromatography on silica gel with 14.2–16.5% acetone/methylene chloride, and recrystallization from acetone/hexane, 19 g. of 11β-hydroxy-21-acetoxy-1,4,16-pregnatriene-3,20-dione is obtained, m.p. 202.5–203° C.

UV: $\epsilon_{242}=23,400$ (methanol).

EXAMPLE 2

10 g. of 9-fluoro-11β,17,21-trihydroxy-16α-methyl-1,4-pregnadiene-3,20-dione is agitated with 1 g. of zinc acetate dihydrate in 600 ml. of glacial acetic acid for 4 hours at 120° C. The reaction product is precipitated into ice water, the precipitate is vacuum-filtered, taken up in methylene chloride, and washed repeatedly with water, thus obtaininig 6.8 g. of 9-fluoro-11β,20-dihydroxy-3-oxo-16α-methyl-1,4,17(20)-pregnatrien-21-al.

A sample, purified by chromatography on silica gel with 4.5–5% acetone/methylene chloride melts at 224–226° C.

UV $\epsilon_{240}=15,500$; $\epsilon_{281}=13,800$ (methanol).

5.7 g. of 9-fluoro-11β,20-dihydroxy-3-oxo-16α-methyl-1,4,17(20)-pregnatrien-21-al is allowed to react with 10 ml. of acetic anhydride in 20 ml. of pyridine for 1 hour at room temperature. The reaction solution is stirred into ice water. The precipitate is vacuum-filtered, taken up in methylene chloride, washed several times with water, and dried over sodium sulfate. After recrystallization from acetone/hexane, 2.4 g. of 9-fluoro-11β-hydroxy-20-acetoxy-3-oxo-16α-methyl - 1,4,17(20) - pregnatrien-21-al is obtained, m.p. 231–233° C.

UV: $\epsilon_{247}=28,500$ (methanol).

2.3 g. of 9-fluoro-11β-hydroxy-20-acetoxy-3-oxo-16α-methyl-1,4,17(20)-pregnatrien-21-al is agitated with 2.3 g. of anhydrous potassium acetate in 50 ml. of dimethyl formamide for 2 hours at 120° C. under a nitrogen atmosphere. After precipitation into ice water, the mixture is worked up analogously to Example 1. Chromatography on silica gel with 7.6–11.6% acetone/methylene chloride and recrystallization from acetone/hexane yield 1.3 g. of 9-fluoro-11β-hydroxy-21-acetoxy-16-methyl-1,4,16-pregnatriene-3,20-dione, m.p. 224–227° C.

UV: $\epsilon_{243}=21,800$ (methanol).

EXAMPLE 3

10 g. of 11β,17,21-trihydroxy-4-pregnene-3,20-dione is agitated with 1 g. of zinc acetate in 400 ml. of glacial acetic acid for 3 hours at 120° C. The reaction mixture is concentrated extensively under vacuum, taken up in methylene chloride, and washed repeatedly with water, thus producing 9.3 g. of 11β,20-dihydroxy-3-oxo-4,17(20)-pregnadien-21-al as a crude product, which is acetylated with 25 ml. of acetic anhydride in 50 ml. of pyridine at room temperature. After precipitation into ice water, the reaction product is taken up in methylene chloride and washed with water. The thus-obtained 11β-hydroxy-20-acetoxy-4,17(20)-pregnadien-21-al is agitated, in the form of the crude product, with 9.6 g. of anhydrous potassium acetate in 192 ml. of dimethylformamide under a nitrogen atmosphere for 1 hour at 110° C. After precipitation into ice water, the reaction mixture is worked up analogously to Example 1, thus obtaining, after chromatography on silica gel with 9.2–11% acetone/methylene chloride, 4.5 g. of 11β-hydroxy - 21 - acetoxy-4,16-pregnadiene-3,20-dione, m.p. 144–146° C. (acetone/hexane).

UV: $\epsilon_{240}=24,200$ (methanol).

EXAMPLE 4

1.2 g. of 20-acetoxy-3-oxo-1,4,17(20)-pregnatrien-21-al (produced, for example, according to Herzog et al., J. Am. Chem. Soc. 83 [1961] 4073) is agitated in 20 ml. of dimethylacetamide with 1.1 g. of anhydrous potassium acetate under a nitrogen atmosphere at 120° C. for 1 hour. After precipitation into ice water and working up of the reaction mixture in accordance with Example 1, the product is chromatographed on silica gel with 7–8.5% acetone/methylene chloride, thus obtaining 720 mg. of 21-acetoxy-1,4,16-pregnatriene-3,20-dione, m.p. 186–187° C.

UV: $\epsilon_{242}=26,000$ (methanol).

EXAMPLE 5

12.5 g. of 9-fluoro-11β,17,21-trihydroxy-4-pregnene-3,20-dione is agitated with 1.3 g. of zinc acetate dihydrate in 500 ml. of glacial acetic acid for 2 hours at 120° C.

The reaction solution is extensively concentrated under vacuum. The residue is taken up in methylene chloride, washed neutral with water, and dried over sodium sulfate, thus producing 12.3 g. of 9-fluoro-11β,20-dihydroxy-3-oxo-4,17(20)-pregnadiene-21-al. A sample purified by chromatography on silica gel with 5–9% acetone/methylene chloride melts at 224–226° C.

UV: ε$_{239}$=17,200; ε$_{285}$=10,700 (methanol).

12 g. of 9-fluoro-11β,20-dihydroxy-3-oxo-4,17(20)-pregnadien-21-al is acetylated, analogously to Example 3, with 25 ml. of acetic anhydride in 50 ml. of pyridine and worked up. After chromatography on silica gel with 8–12% acetone/methylene chloride, 8.8 g. of 9-fluoro-11β-hydroxy-20-acetoxy-3-oxo-4,17(20) - pregnadien-21-al is obtained. A sample, recrystallized from ethyl acetate, melts at 248–254° C.

UV: ε$_{243}$=27,700 (methanol).

8.8 g. of 9-fluoro-11β-hydroxy-20-acetoxy-3-oxo-4,17(20)-pregnadien-21-al is agitated, analogously to Example 1, with 8.8 g. of anhydrous potassium acetate in 170 ml. of dimethylformamide at 120° C. After the reaction mixture has been worked up by precipitation into ice water and chromatography on silica gel with 9.5–13.5% acetone/methylene chloride, 5.2 g. of 9-fluoro-11β-hydroxy-4,16-pregnadiene-3,20-dione is produced, m.p. 183–185° C.

UV: ε$_{240}$=25,900 (methanol).

EXAMPLE 6

4 g. of 17,21-dihydroxy-1,4,9(11)-pregnatriene-3,20-dione is agitated with 500 mg. of zinc acetate dihydrate in 200 ml. of glacial acetic acid for 3 hours at 120° C. Then, the reaction product is poured into ice water; the precipitate is vacuum-filtered, taken up in methylene chloride, and washed several times with water, thus obtaining 3.6 g. of 20-hydroxy-3-oxo-1,4,9(11),17(20)-pregnatetraen-21-al which is reacted, in the form of the crude product, with 7 ml. of acetic anhydride in 14 ml. of pyridine at room temperature. After the reaction mixture has been worked up analogously to Example 2 one obtains 2.7 g. of 20-acetoxy-3-oxo-1,4,9(11),17(20)-pregnatetraen-21-al as an oil, which latter is heated in 50 ml. of dimethyl sulfoxide with 2.7 g. of lithium carbonate for 2 hours at 110° C. under a nitrogen atmosphere. After precipitation into ice water, the precipitate is taken up in methylene chloride. Chromatography on silica gel with 11–13% acetone/hexane and recrystallization from acetone/hexane yield 1.8 g. of 21-acetoxy-1,4,9(11),16-pregnatetraene-3,20-dione, m.p. 154/155–158° C.

UV: ε$_{239}$=23,400 (methanol).

EXAMPLE 7

1 g. of 11β-hydroxy-20-acetoxy-3-oxo-1,4,17(20)-pregnatrien-21-al is agitated under nitrogen atmosphere with 700 mg. of anhydrous barium acetate in 20 ml. of glacial acetic acid for 2 hours at 110° C. The reaction mixture has been worked up, analogously to Example 1. 230 mg. of 11β-hydroxy-21-acetoxy-1,4,16-pregnatriene-3,20-dione is obtained, m.p. 202–203° C.

Following the procedure of Example 1 similar results are obtained by substituting equal quantities of potassium salt of benzoic acid or p-toluic acid for the potassium salt used therein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of Δ$^{4,16}$-11β-hydroxy-3,20-diketo-21-acyloxy steroids of the formula

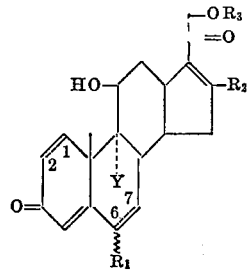

wherein $C_1$═$C_2$ and $C_6$═$C_7$ each represent a saturated or unsaturated carbon-to-carbon bond, $R_1$ is H or methyl in the α- or β-position when $C_6$═$C_7$ is a single bond, or fluorine, chlorine, bromine or methyl when $C_6$═$C_7$ is a double bond, $R_2$ is H or lower alkyl, $R_3$ is lower alkanoyl is of 1–5 carbon atoms and Y is hydrogen or fluorine, which comprises heating at a temperature from about 80° C. to the boiling point of the reaction solvent a non-esterified 11β,17,21 - trihydroxy-20-keto-pregnane of the formula

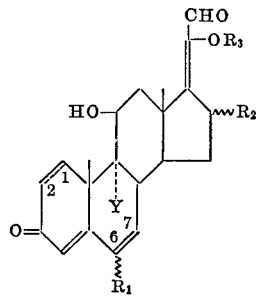

wherein $C_1$═$C_2$, $C_6$═$C_7$, $R_1$, $R_3$ and Y have the above-indicated meanings and $R_2$ stands for hydrogen or lower alkyl, in a polar organic solvent, in the presence of an alkali or alkaline earth salt of a lower alkanoic acid of 1–5 carbon atoms, of a carbonic acid, or of an aromatic carboxylic acid to form said 21-acyloxy steroid.

2. A process according to Claim 1 wherein the reaction is conducted at about 110–130° C.

3. A process according to Claim 1 wherein the salt is a salt of a lower alkanoic acid.

4. A process according to Claim 3 wherein the salt is the potassium salt.

5. A process according to Claim 3 wherein the acid is acetic acid.

6. A process according to Claim 1 wherein the solvent is dimethylformamide or dimethylacetamide.

7. A process according to Claim 1 wherein the salt is the potassium salt of acetic acid and the solvent is dimethylformamide or dimethylacetamide.

References Cited

J.A.C.S., (1960) article by Taub et al., pp. 2258–2259 relied on.

ELBERT L. ROBERTS, Primary Examiner

U.S. Cl. X.R.

424—243; 260—397.47